(12) United States Patent
Kim et al.

(10) Patent No.: US 10,034,238 B2
(45) Date of Patent: Jul. 24, 2018

(54) METHOD FOR SUPPORTING POWER SAVING MODE AND RADIO DEVICE THEREFOR

(71) Applicant: LG Electronics Inc., Seoul (KR)

(72) Inventors: Taehun Kim, Seoul (KR); Jinsook Ryu, Seoul (KR); Jaehyun Kim, Seoul (KR); Hyunsook Kim, Seoul (KR); Laeyoung Kim, Seoul (KR); Taehyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/785,660

(22) PCT Filed: Jan. 8, 2015

(86) PCT No.: PCT/KR2015/000170
§ 371 (c)(1),
(2) Date: Oct. 20, 2015

(87) PCT Pub. No.: WO2015/105339
PCT Pub. Date: Jul. 16, 2015

(65) Prior Publication Data

US 2016/0073338 A1    Mar. 10, 2016

Related U.S. Application Data

(60) Provisional application No. 61/926,238, filed on Jan. 10, 2014, provisional application No. 61/926,406, (Continued)

(51) Int. Cl.
*H04W 4/00* (2018.01)
*H04W 52/02* (2009.01)
(Continued)

(52) U.S. Cl.
CPC ....... *H04W 52/0209* (2013.01); *H04W 52/02* (2013.01); *H04W 52/0229* (2013.01); (Continued)

(58) Field of Classification Search
None
See application file for complete search history.

(56) References Cited

U.S. PATENT DOCUMENTS

2012/0039313 A1* 2/2012 Jain ................... H04B 17/318
370/338
2012/0115454 A1* 5/2012 Liao .................... H04W 60/02
455/418

(Continued)

FOREIGN PATENT DOCUMENTS

CN    102111856 A    6/2011
CN    103379593 A    10/2013
(Continued)

OTHER PUBLICATIONS

NEC: "Editor's note removal and correction to the Network Assisted Power Saving solution", S2-132851, SA WG2 Meeting #98, Valencia, Spain, Jul. 15-19, 2013.
(Continued)

*Primary Examiner* — Edan Orgad
*Assistant Examiner* — Sithu Ko
(74) *Attorney, Agent, or Firm* — Dentons US LLP

(57) ABSTRACT

A disclosure of the present invention provides a method for supporting a power saving mode (PSM) in a radio device. According to the method, the radio device may transmit a first message including a first activation time value to a network entity when the radio device requires the PSM. Then, the radio device may receive a second message including a second activation time value from the network entity. The radio device may enter a PSM state on the basis (Continued)

of the second activation time value. When it is necessary to stop the PSM or change the second activation time, the radio device may transmit a third message at the very time point.

14 Claims, 21 Drawing Sheets

Related U.S. Application Data filed on Jan. 13, 2014, provisional application No. 61/954,542, filed on Mar. 17, 2014.

(51) Int. Cl.
*H04W 76/20* (2018.01)
*H04W 76/27* (2018.01)

(52) U.S. Cl.
CPC ............ *H04W 76/20* (2018.02); *H04W 76/27* (2018.02); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/23* (2018.01); *Y02D 70/24* (2018.01)

(56) References Cited

U.S. PATENT DOCUMENTS

| | | | |
|---|---|---|---|
| 2013/0039244 A1* | 2/2013 | Sun ................... | H04W 52/0235 370/311 |
| 2015/0043403 A1* | 2/2015 | Martinez Tarradell ............. | H04W 64/006 370/311 |
| 2016/0286491 A1* | 9/2016 | Haneji .............. | H04W 52/0212 |

FOREIGN PATENT DOCUMENTS

| | | |
|---|---|---|
| JP | 2016-519502 A | 6/2016 |
| KR | 100785814 | 12/2007 |
| KR | 1020130042014 | 4/2013 |
| WO | 2013028026 | 2/2013 |
| WO | 2013173814 | 11/2013 |
| WO | 2014005452 A1 | 1/2014 |
| WO | 2014/162207 A1 | 10/2014 |

OTHER PUBLICATIONS

Huawei, et al.: "Introducing UE Power Saving Mode", S2-134548, SA WG2 Meeting #100, San Francisco, USA, Nov. 11-15, 2013.
Samsung: "Clarifications of the specification of T3412 Extended Value", C1-132224, 3GPP TSG-CT WG1 Meeting #83, Chengdu, China, May 20-24, 2013.

* cited by examiner

METHOD FOR SUPPORTING POWER SAVING MODE AND RADIO DEVICE THEREFOR

This application is a 35 USC § 371 National Stage entry of International Application No. PCT/KR2015/000170 filed on Jan. 8, 2015, and claims priority to U.S. Provisional Application Nos. 61/926,238 filed on Jan. 10, 2014; 61/926,406 filed on Jan. 13, 2014 and 61/954,542 filed on Mar. 17, 2014, all of which are hereby incorporated by reference in their entireties as if fully set forth herein.

BACKGROUND OF THE INVENTION

Field of the Invention

The presented invention relates to a method and wireless device for supporting power saving mode.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (the S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or the P-GW) 53 corresponds to the termination point of a data interface toward a packet data network. The PDN GW 53 can support policy enforcement features, packet filtering, charging support, etc. Furthermore, the PDN GW (or the P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are presented in the different function entities of an E-UTRAN and an EPC is called a reference point. Table 1 below defines reference points shown in FIG. 1. In addition to the reference points shown in the example of Table 1, various reference points may be presented depending on a network configuration.

TABLE 1

| Reference point | Description |
| --- | --- |
| S1-MME | Reference point for the control plane protocol between E-UTRAN and the MME |
| S1-U | Reference point between E-UTRAN and Serving GW for the per bearer user plane tunnelling and inter an eNodeB path switching during handover) |
| S3 | It enables user and bearer information exchange for inter 3GPP access network mobility in Idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |

TABLE 1-continued

| Reference point | Description |
| --- | --- |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmitter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are presented in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 transmits a randomly selected random access preamble to the eNodeB 20. Here, the UE 10 selects one of the 64 candidate random access preambles. Furthermore, the UE selects a subframe corresponding to the PRACH configuration index. The UE 10 transmits the selected random access preamble in the selected subframe.

The eNodeB 20 that has received the random access preamble transmits a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 shows a 3GPP service model for supporting MTC.

A Machine Type Communication (MTC) device may be used in a mobile communication system. MTC implies communication between one machine and the other machine or between a machine and a server, excluding a human intervention. A device used in this case is called the MTC device, and a server used in this case is called an MTC server. A service provided through the MTC device is distinguished from a communication service based on the human intervention, and may be applied to various ranges of services.

The aforementioned MTC device is a communication device for performing communication between one machine and another machine or between a machine and a server, and is not much different from a User Equipment (UE) with a human intervention, except that the human intervention is excluded. That is, the MTC device may correspond to the UE excluding the human intervention. However, in terms of excluding the human intervention, some problems may occur if a message transmission/reception method (e.g., a paging message transmission/reception method) of the UE with the human intervention is collectively applied to the MTC device.

To support the MTC, although it is defined that communication is achieved through a PS network in GSM/UMTS/EPS of the 3GPP standard, a method applicable also to a CS network is described in the presented specification.

A UE used for the MTC (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC. It is shown in FIG. 7 that the UE used for the MTC is connected to a 3GPP network (e.g., UTRAN, E-UTRAN, GERAN, I-WLAN, etc.) through an Um/Uu/LTE-Uu interface. The architecture of FIG. 7 includes various MTC models (e.g., a direct model, an indirect model, and a hybrid model).

Entities shown in FIG. 6 are now described.

In FIG. 6, an application server is a server on a network on which an MTC application is executed. The aforementioned various techniques for implementing the MTC applications may be applied to the MTC application server, and a detailed description thereof will be omitted. In addition, in FIG. 7, the MTC application server may access the MTC server through a reference point API, and a detailed description thereof will be omitted. Alternatively, the MTC application server may be collocated with the MTC server.

The MTC server (e.g., a Services Capability Server (SCS) shown in the figure) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC action. To support the MTC indirect or hybrid model, one or more MTC-IWFs may exist in a Home PLMN (HPLMN). The MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, etc.

An SMS-SC (Short Message Service-Service Center)/IP-SM-GW (Internet Protocol Short Message GateWay) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related action.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering, a function for receiving a trigger indication from the MTC-IWF and for processing it in a form of a message provided to the MTC UE may be performed.

A GGSN (Gateway GPRS Support Node)/the S-GW (Serving-Gateway)+the P-GW (Packet Data Network-Gateway) may perform a function of a gateway which serves for connection of a core network and an external network.

Table 2 below is a summary of an important reference point in FIG. 7.

TABLE 2

| Reference point | Description |
| --- | --- |
| Tsms | It is the reference point used by an entity outside the 3GPP system to communicate with UEs used for MTC through an SMS. |
| Tsp | It is the reference point used by an entity outside the 3GPP system to communicate with the MTC-IWF related control plane signalling. |
| T4 | A reference point used by the MTC-IWF to route device trigger to the SMS-SC in the HPLMN. |
| T5a | A reference point used between the MTC-IWF and the serving SGSN. |
| T5b | A reference point used between the MTC-IWF and the serving the MME. |
| T5c | A reference point used between the MTC-IWF and the serving MSC. |
| S6m | A reference point used by the MTC-IWF to interrrogate the HSS/HLR for E.164 MSISDN (Mobile Station International Subscriber Directory Number) or external identifier mapping to IMSI and gather UE reachability and configuration information. |

At least one of the reference points T5*a*, T5*b*, and T5*c* is referred to as T5.

Meanwhile, user plane communication with the MTC server in case of the indirect and hybrid model and communication with the MTC application in case of the direct and hybrid model may be performed by using the existing protocol through reference points Gi and SGi.

The 3GPP TS 23.682 document may be incorporated by reference for details of the description of FIG. 6.

FIG. 7 shows an example of a service via an MTC device.

Services through an MTC device may be divided into several types. For example, the services may include a service in which an MTC device monitors a variety of types of information and a service in which an entity within an eNodeB or a core network monitors a variety of types of information.

Referring to FIG. 7, in an example of the aforementioned first service, a metering service, a road information service, or a user electronic device coordination service may be provided through an MTC device. In this case, when the MTC device monitors metering information, road traffic information, etc. and transmits them to an eNodB, the eNodeB may transmit the information to an MTC server. An MTC user may use provided services based on the information.

In an example of the aforementioned second service, a service in which a movement of an MTC device mounted on a thing is monitored may be taken into consideration. More specifically, for example, an MTC device may be attached to a fixed thing, such as a vending machine, or a mobile thing, such as a vehicle. An entity within an eNodeB or a core network may monitor the path along which the MTC device moves.

Meanwhile, it is most important to use the battery of an MTC device for a long time because there is almost no intervention of a person in the MTC device.

However, in a prior art, there was no scheme for supporting this.

SUMMARY OF THE INVENTION

Accordingly, an object of one disclosure of this specification is to provide a scheme capable of solving the aforementioned problem.

In order to accomplish the above object, one disclosure of this specification provides a method supporting Power Saving Mode (PSM) in a wireless device. The method may comprise: transmitting a first message including a first active time value to a network entity when PSM is required; receiving, from the network entity a second message including a second active time value, wherein if an application of PSM by the wireless device is accepted by the network entity, the first active time value is used to determine the second active time value; entering a PSM state based on the second active time value such that the wireless apparatus pretends to be power-offed in order not to receive any downlink data, but remains registered with the network entity in order to transmit an uplink data at any time; whenever the PSM needs to be stopped or when the second active time value needs to be changed, transmitting a third message.

The first message may be a Tracking Area Update (TAU) request message or a Routing Area Update (RAU) request message, and the second message may be a TAU acceptance message or an RAU acceptance message.

The third message may be a TAU request message or an RAU request message.

The TAU request message or the RAU request message may be transmitted whenever the PSM needs to be stopped or when the second active time value needs to be changed.

If the change of the second active time is required, the third message may include one or more of a value of a third active time, a value of a periodic TAU timer, and a value of a periodic RAU timer requested by the wireless device.

The value of the periodic TAU timer and the value of the periodic RAU timer may be defined by Ext T3312 or EXT T3412.

The step of entering the PSM state may include a step of deactivating an Access Stratum (AS). The step of transmitting the third message may include: activating the access stratum whenever the PSM needs to be stopped or when the second active time value needs to be changed.

In order to accomplish the above object, one disclosure of this specification provides a wireless device supporting Power Saving Mode (PSM). The wireless device may include: a transceiver unit; and a control unit configured to control the transceiver to transmit a first message including a first active time value to a network entity when PSM is required and enter a PSM state if a second message including the second active time value is received from the network entity. If an application of PSM by the wireless device is accepted by the network entity, the first active time value may used to determine the second active time value. And, in the PSM, the wireless apparatus may pretend to be power-offed in order not to receive any downlink data, but remain registered with the network entity in order to transmit an uplink data at any time. The control unit may be further configured to transmit a third message whenever the PSM needs to be stopped or when the second active time value needs to be changed.

In accordance with the disclosures of this specification, the aforementioned conventional problem is solved.

DESCRIPTION OF EXEMPLARY EMBODIMENTS

Figure 1:
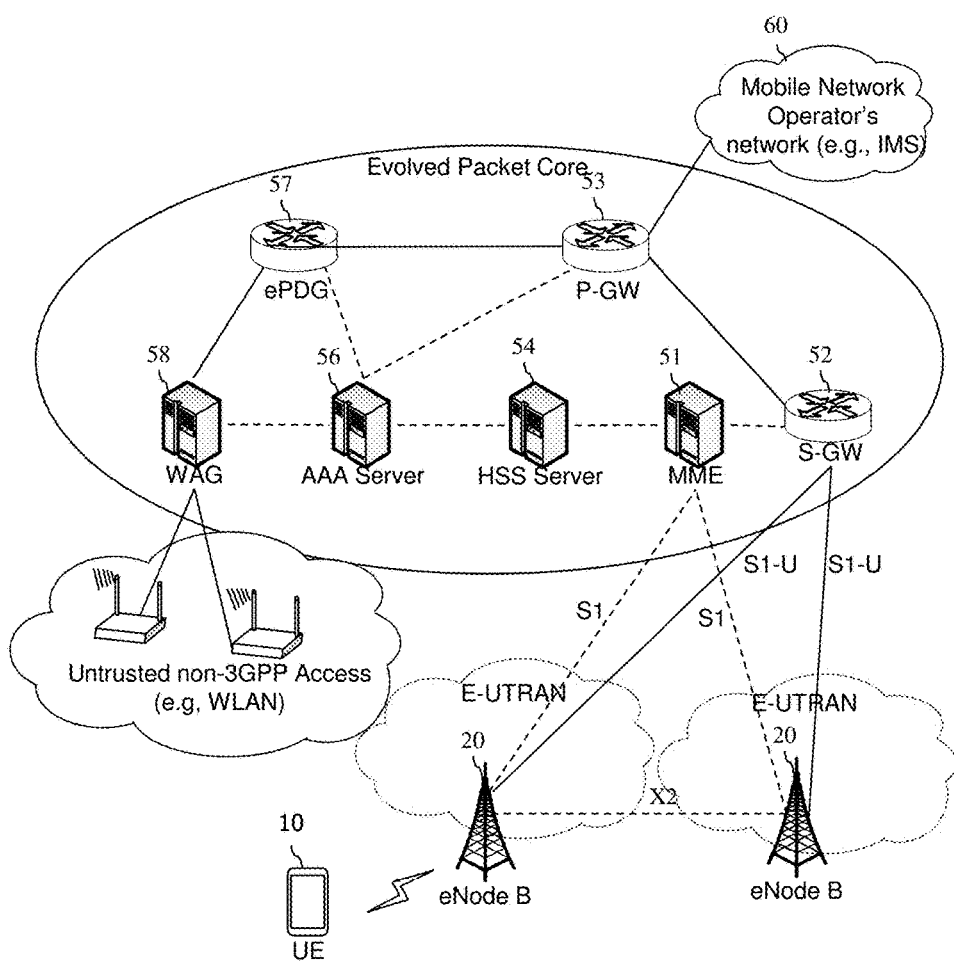
FIG. 1 shows the structure of an advanced mobile communication network.
Figure 2:
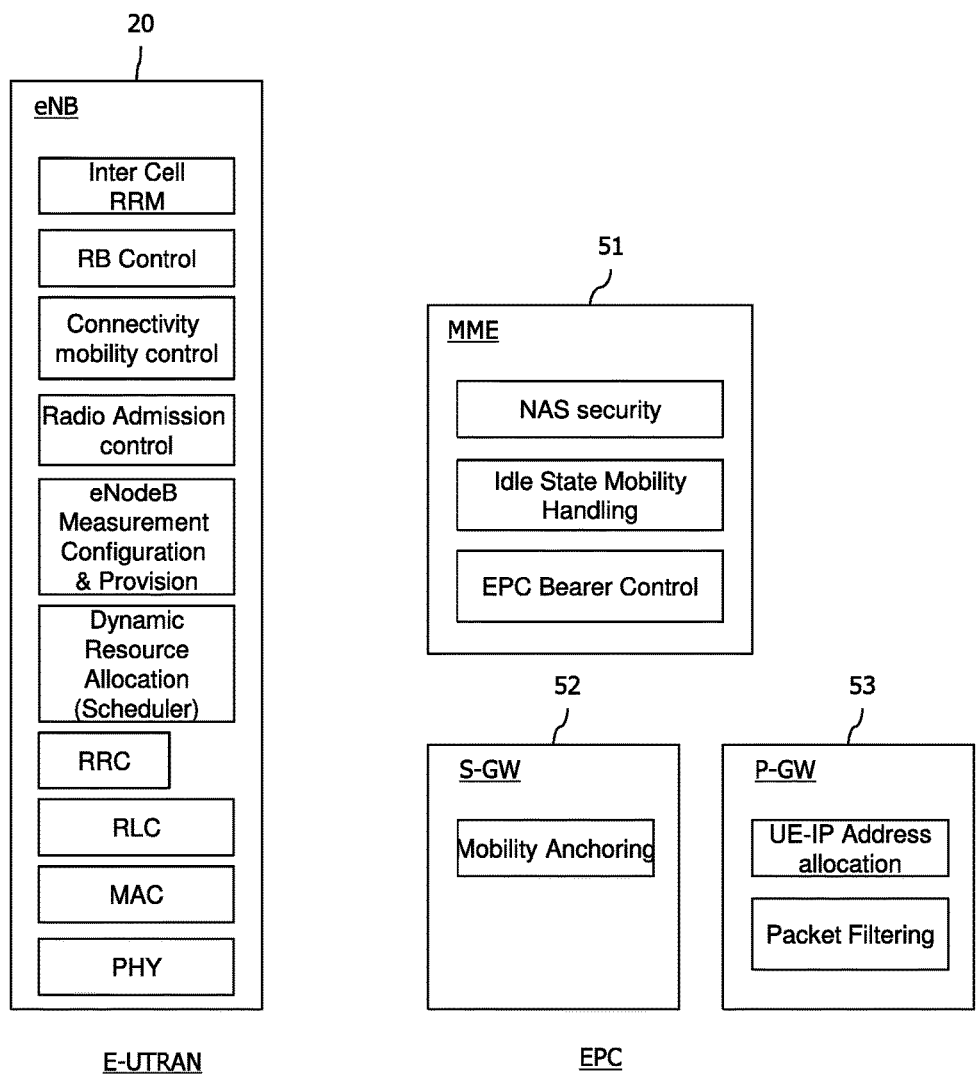
FIG. 2 is an exemplary diagram showing the architecture of a common E-UTRAN and a common EPC.
Figure 3:
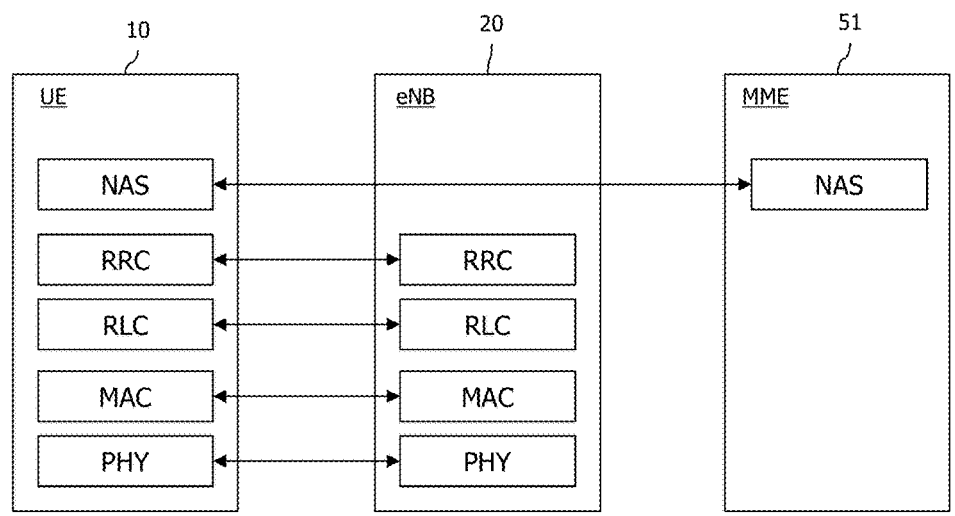
FIG. 3 is an exemplary diagram showing the structure of a radio interface protocol in a control plane between UE and an eNodeB.
Figure 4:
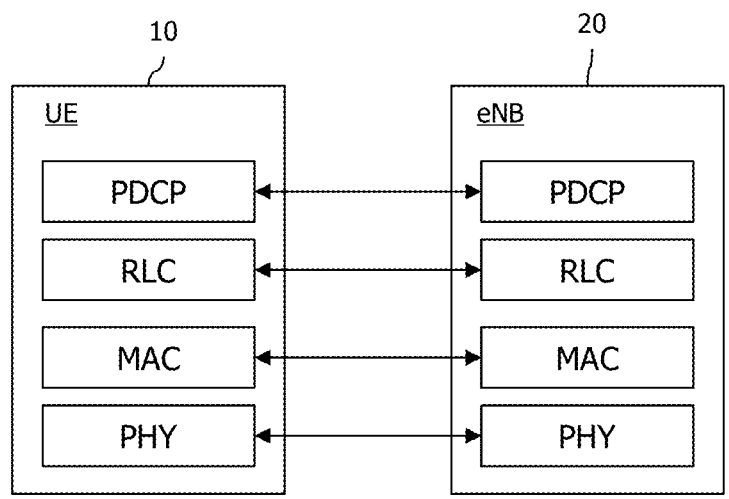
FIG. 4 is another exemplary diagram showing the structure of a radio interface protocol in a user plane between UE and an eNodeB.
Figure 5:
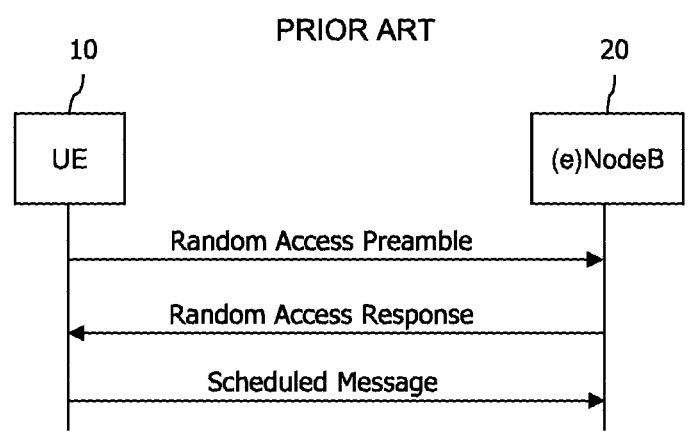
FIG. 5 is a flowchart illustrating a random access process in 3GPP LTE.
Figure 6:
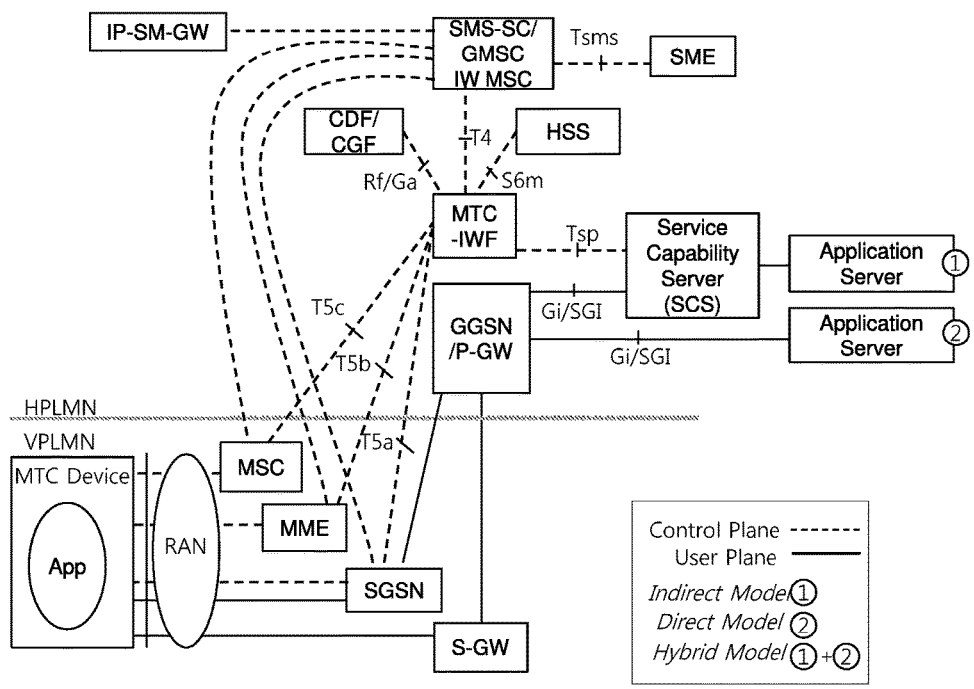
FIG. 6 is a conceptual diagram showing a 3GPP service model for an MTC support.
Figure 7:
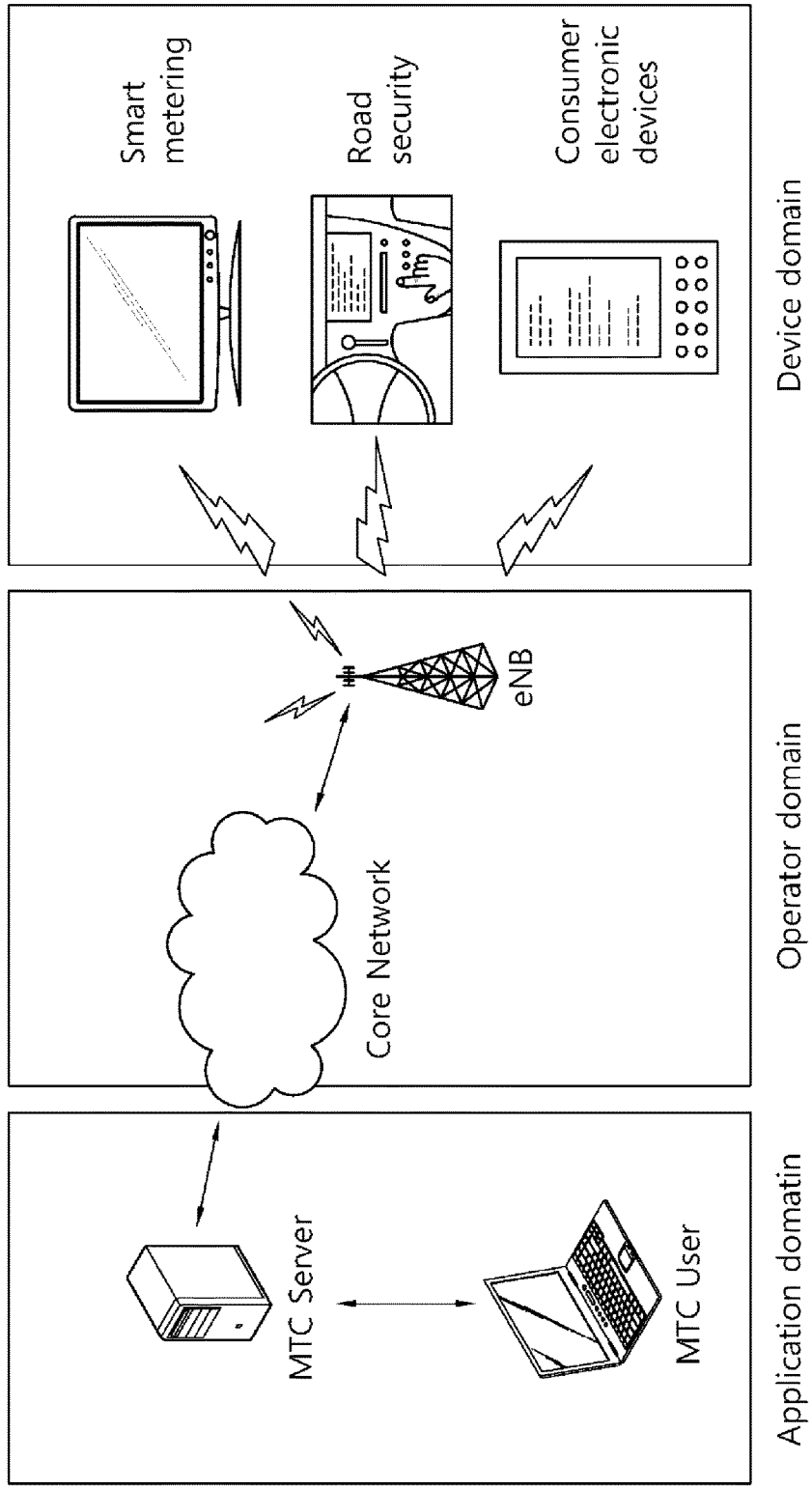
FIG. 7 shows an example of services through an MTC device.

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition Of Terms

For better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

NAS (Non-Access-Stratum): A higher stratum of a control plane between a UE and an MME. The NAS supports mobility management, session management, IP address management, etc., between the UE and the network.

<Power Saving Mode (PSM)>

In order to reduce power consumption, an MTC device may apply Power Saving Mode (PSM). When entering the PSM state, the MTC device deactivates an Access Stratum (AS), and thus PSM is similar to a power-off state. However, in the PSM state, the MTC device may be presented in the state in which it has been registered with a network. Accordingly, the PSM state and the power-off state are different because the MTC device does not need to be reattached to the network and does not need to reestablish a PDN connection.

When an MTC device enters the PSM state, for example, it remains in the PSM state until a mobile-originated event, such as the generation or detachment of a periodic TAU/RAU or uplink data, enables the MTC device to start any procedure on a network.

Although the MTC device is in the PSM state, it may deviate from PSM at any time if it requires a mobile-originated service. That is, although the MTC device is in the PSM state, it may activate the access stratum (AS) at any time with respect to the mobile-originated service and restarts an operation of idle mode.

Meanwhile, when a mobile-reachable timer expires and the active time of the MTC device expires, the MME may be aware that the MTC device has entered the PSM state and thus paging is impossible.

In contrast, when the MTC device enters the PSM state, it is unable to immediately receive a mobile-terminated service. In other words, if the MTC device has entered the PSM state, it may respond only during an active time cycle after a mobile-originated event, such as signal transmission or data transmission after a periodic Tracking Area Update (TAU) or Routing Area Update (RAU) procedure, with respect to the mobile-terminated service.

Accordingly, PSM is suitable for an MTC device which not requires a mobile-originated service and mobile-terminated service that are not frequent and is also suitable to an MTC device which can endure some delay in communication.

Meanwhile, an MTC device needs to request an active time that is long enough to receive data, such as a potential mobile-terminated service or SMS.

If an MTC device wants to use PSM, the MTC device needs to request the value of an active time during each attach and TAU/RAU procedure. If a network supports PSM and permits the MTC device to use PSM, it allocates the value of the active time to the MTC device. The network may determine the value of the active time to be allocated to the MTC device by taking into consideration the value of the active time requested by the MTC device and an MME/SGSN configuration. If the value of the active time allocated by the network is not satisfactory, the MTC device may request the value of its wanted active time only during the period of a next TAU/RAU procedure.

A minimum length recommended for the active time is a length enough to transfer SMS that waits and may be a value obtained by adding 10 seconds to twice DRX cycles, for example. Specifically, if an 'msg waiting flag' has been set within the MME/SGSN, a minimum length recommended for the active time is a length enough to trigger SMS that waits within the SMSC so that the SMS is transferred to the MME/SGSN through the HSS based on the set 'msg waiting flag' and may be a value obtained by adding 10 seconds to twice DRX cycles, for example.

The waiting SMS means that the SMS from a network to an MTC device has been reached, but the SMS is stored in the standby state because the MTC device is in the PSM state and thus unable to immediately transfer the SMS. However, the active time may be shorter than a time required to transfer the waiting SMS. If the MME/SGSN has set the active time of a short length as described above, the MME/SGSN and the RAN may have been configured to maintain a connection with the MTC device for a sufficiently long time so that the waiting SMS is transferred.

Furthermore, an MTC device to which PSM has been applied requests the value of a periodic TAU/RAU timer suitable for the latency/responsiveness of a mobile-terminated service from a network during an attach and TAU/RAU procedure. If the network has allocated the value of the periodic TAU/RAU timer to the MTC device, but the MTC device is not satisfied with the value, the MTC device may request the value of its wanted periodic TAU/RAU timer only during the period of a next TAU/RAU procedure.

As a result, if an MTC device wants PSM to be supported and wants to use PSM, it needs to request both the value of an active time and the value of a periodic TAU/RAU timer from a network during an attach and TAU procedure. In contrast, the MTC device may request the value of a periodic TAU/RAU without requesting the value of an active time. Likewise, the network is unable to randomly allocate the value of an active time although the MTC device has not request the value of the active time.

Meanwhile, a description is given with reference to drawings.

Figure 8A:
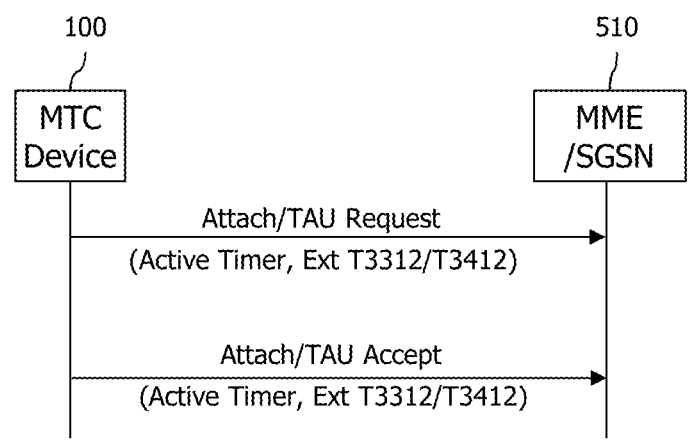
FIG. 8a shows a process for negotiating an active timer for Power Saving Mode (PSM).
Figure 8B:
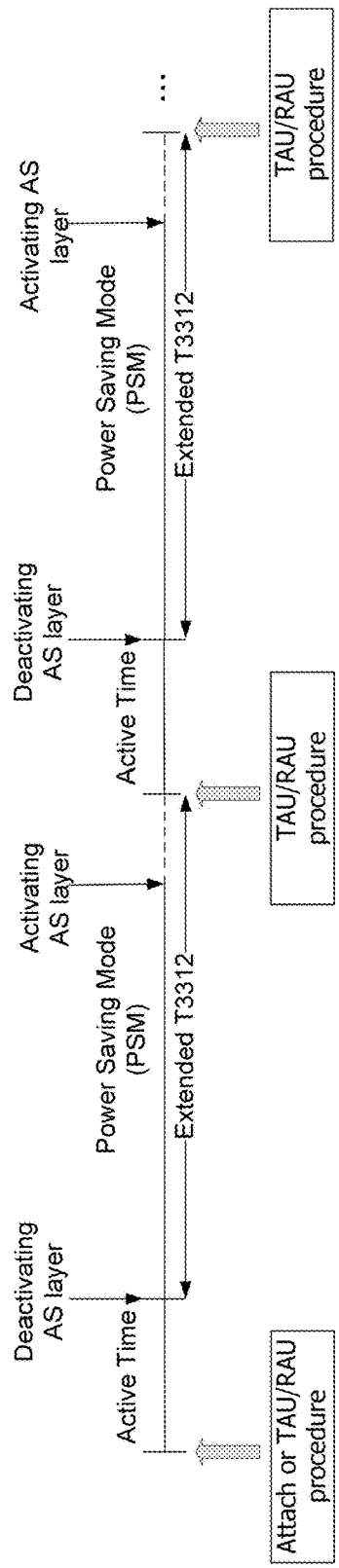
FIGS. 8b and 8c are exemplary diagrams showing the operation of Power Saving Mode (PSM).
Figure 8C:
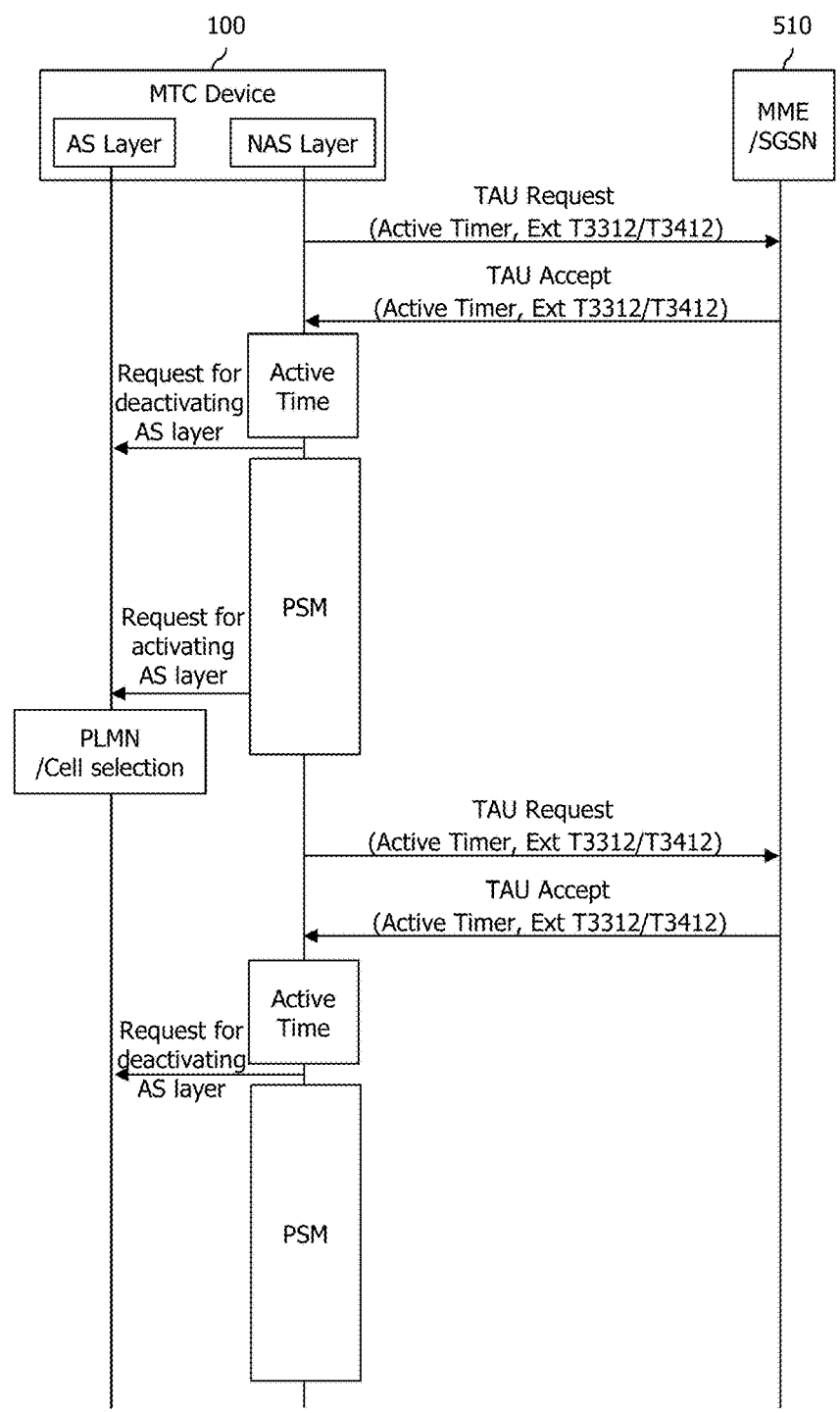

FIG. 8a shows a process for negotiating an active timer for Power Saving Mode (PSM). FIGS. 8b and 8c are exemplary diagrams showing the operation of Power Saving Mode (PSM).

As shown in FIG. 8a, the MTC device 100 includes the value of its wanted active time (i.e., the value of its wanted active timer) and the value of a periodic TAU/RAU timer (e.g., Ext T3412 or Ext T3312) in an attach request message or TAU request message and transmits the attach request message or TAU request message to the MME/SGSN 510. When the MME/SGSN 510 receives the request message, it checks whether PSM is supported. If PSM is supported, the MME/SGSN 510 transmits an attach acceptance message or a TAU acceptance message, including the value of the active time (i.e., the value of the active timer) and the value of the periodic TAU/RAU timer (e.g., Ext T3412 or Ext T3312), to the MTC device 100. In this case, the value of the active time (i.e., the value of the active timer) and the value of the periodic TAU/RAU timer (e.g., Ext T3412 or Ext T3312) included in the acceptance message may be a value requested by the MME. In this case, the value of the periodic TAU/RAU timer (e.g., Ext T3412 or Ext T3312) may not be included. In this case, the MTC device may use a basic value for the value of the periodic TAU/RAU timer (e.g., Ext T3412 or Ext T3312). Alternatively, although the MTC device has not included the value of the periodic TAU/RAU timer (e.g., Ext T3412 or Ext T3312) in the request message, the MME may randomly set the value of the periodic TAU/RAU timer, may include the set value of the periodic TAU/RAU timer in the acceptance message, and may transmit the acceptance message.

Meanwhile, as shown in FIGS. 8b and 8c, if the MTC device has requests the value of the active time and the network has allocated the value of the active time, the MTC device drives the active timer based on the allocated value of the active time. Likewise, when the state switches from ECM_CONNECTED to ECM_IDLE, the MME drives a mobile-reachable timer based on the value of the active time.

Furthermore, as shown in FIGS. 8b and 8c, when the active timer expires, the MTC device deactivate its own access stratum (AS) and switches to the PSM state. In the PSM state, the MTC device stops the entire procedure of idle mode due to the deactivation of the access stratum (AS), but drives the timer of the NAS layer, for example, the periodic TAU/RAU timer (e.g., Ext T3412 or Ext T3312).

The MTC device does not activate the access stratum (AS) again and does not resume the procedure of idle mode until it performs a periodic TAU procedure by terminating the periodic TAU/RAU timer (e.g., Ext T3412 or Ext T3312).

Right before the periodic TAU/RAU timer (e.g., Ext T3412 or Ext T3312) expires, the MTC device activates the access stratum (AS) again and performs a radio access configuration process (PLMN selection or cell selection) necessary to set up communication with the EPC.

When the periodic TAU/RAU timer (e.g., Ext T3412 or Ext T3312) expires, the MTC device performs a TAU/RAU procedure again and then enters the PSM state.

Meanwhile, as described above, it is assumed that the MTC device is not satisfied with the value of the active time (the value of the active timer) allocated by the network. For example, it is assumed that the MTC device has included the value of its wanted active time (the value of its wanted active timer) in an attach request message or a TAU/RAU request message and has transmitted the attach request message or a TAU/RAU request message, but the network has included the value of an active time (the value of an active timer) different from the value of the active time (the value of the active timer) requested by the MTC device in the acceptance message and has transmitted the acceptance message to the MTC device. In this case, as described above, the MTC device enters the PSM state, and when the period of a next TAU/RAU procedure is reached, the MTC device may request the value of the wanted active time. When the MTC device enters the PSM state, the MTC device may terminate the PSM state only when there is data to be transmitted.

The following situation is assumed. For example, when a mobile-originated data (hereinafter called MO data) is generated after the MTC device enters the PSM state, the MTC device activates the access stratum (AS) in order to transmit the MO data. When the access stratum (AS) is activated, the MTC device notifies the network of the transmission of the MO data through a service request message. However, there is a problem in that the MTC device is unable to request the value of the active time through the service request message.

Moreover, when the MTC device notifies the network of the transmission of the MO data through the service request message and then transmits the MO data, the MTC device needs to be able to request the value of its wanted active time (the value of its wanted active timer) from the network through a TAU/RAU request message. However, there is a problem in that the MTC device may not request the value of the wanted active time (the value of its wanted active timer) from the network until the periodic TAU/RAU timer (e.g., Ext T3412 or Ext T3312) expires.

Furthermore, there is a problem in that since the MTC device has not requested the value of the wanted active time (the value of the active timer) as described above, it has to enter the PSM state again based on the value of the active time (the value of the active timer) allocated by the network, which is different from the value of the active time (the value of the active timer) requested by the MTC device, even after the MTC device has transmitted the MO data. If not, there is a problem in that the MTC device has to terminate PSM after transmitting the MO data.

A problem if PSM is maintained even after MO data is transmitted and a problem if PSM is terminated after MO data is transmitted are described below.

1. If PSM is Maintained after MO Data is Transmitted

If the use of PSM is maintained after the transmission of MO data triggered by a service request message is terminated, the value of an active time may use a value used in a previous PSM state or may use a value previously set between a network and an MTC device.

In this case, there is a problem in that the MTC device does not have an opportunity to request the value of its wanted active time. Furthermore, if the MTC device no longer wants to use PSM, it is unable to immediately notify a network of the disuse of PSM and has to wait until the MTC device is able to request the value of the wanted active time through an attach request message or a TAU/RAU request message. If such a case is generated for each consecutive PSM cycle, the MTC device has to wait for a long time in order to stop the use of PSM. This may generate inefficiency in view of a system operation.

2. If PSM is Terminated after the Transmission of MO Data is Terminated

If the use of PSM is terminated after the transmission of MO data triggered by a service request message is terminated, an MTC device needs to transmit an additional TAU/RAU request message in order to transfer its intention to continue to use PSM. This may generate inefficiency in view of a system operation. This is described in detail below with reference to FIGS. 9a and 9b.

Figure 9A:
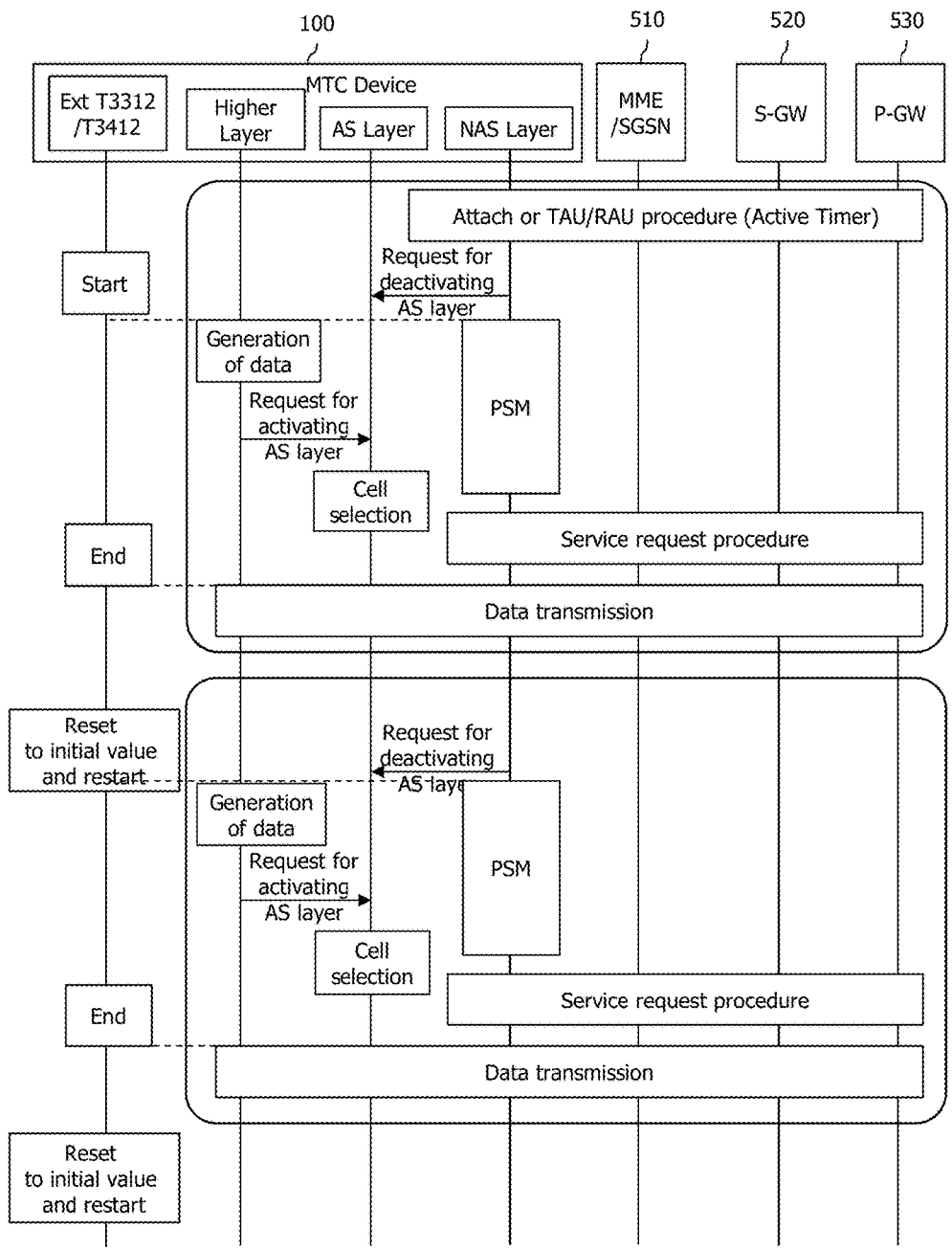
FIG. 9a shows a problem if MO data is frequently transmitted.

FIG. 9a shows a problem if MO data is frequently transmitted.

As may be seen with reference to FIG. 9a, when MO data is generated in the PSM state, the MTC device 100 activates the access stratum (AS) and transmits the MO data.

When the transmission of the MO data is terminated, the MTC device 100 deactivates the access stratum (AS) and enters the PSM state again. Thereafter, when MO data is generated again, the MTC device 100 activates the access stratum (AS) and transmits the MO data. When the transmission of the MO data is terminated, the MTC device 100 deactivates the access stratum (AS) again.

In this case, a case where the generation of MO data is frequently generated is taken into consideration. The MTC device 100 repeats an operation for activating and deactivating the access stratum (AS), thereby increasing power consumption. This violates the original purpose of PSM. In this case, it may be better not to enter the PSM state.

Meanwhile, an operation regarding a periodic TAU/RAU timer (e.g., Ext T3312/T3412) is described when MO data is generated in the PSM state. When entering the PSM state, the MTC device 100 becomes an EMM-IDLE state, and the periodic TAU/RAU timer (e.g., Ext T3312/T3412) is started. In this case, when MO data is generated, the MTC device 100 becomes an EMM-CONNECTED state after transmitting a service request message and stops the periodic TAU/RAU timer (e.g., Ext T3312/T3412). When the MTC device 100 switches from the EMM-CONNECTED state to the EMM-IDLE state after transmitting the MO data, the value of the periodic TAU/RAU timer (e.g., Ext T3312/T3412) is reset to an initial value, and the periodic TAU/RAU timer is started again. In this case, as the periodic TAU/RAU timer (e.g., Ext T3312/T3412) is reset to a new initial value due to the transmission of the MO data, and thus a next TAU/RAU procedure is delayed. Such latency may be consecutively generated in a situation in which MO data is frequently generated. In this case, an opportunity that the MTC device 100 may perform a TAU/RAU procedure continues to be delayed, and thus an opportunity to change a PSM parameter (i.e., the value of an active time) or to terminate PSM is also delayed. In the worst case, a situation in which the MTC device 100 is unable to deviate from PSM by itself may occur. This may deteriorate efficiency of PSM.

Figure 9B:
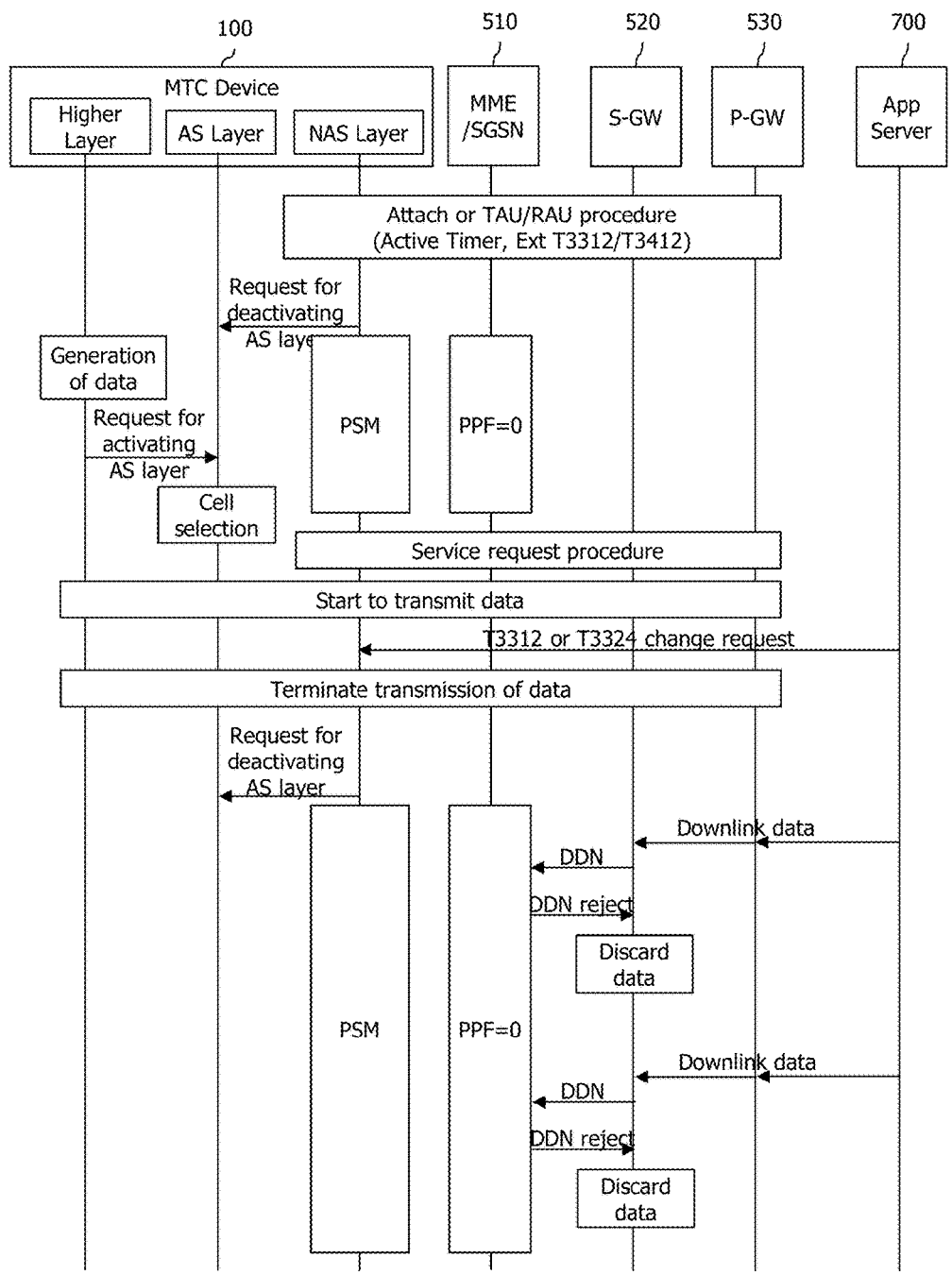
FIG. 9b shows a problem if an application server requests a change of a PSM parameter or the termination of PSM.

FIG. 9b shows a problem if the application server requests a change of the PSM parameter or the termination of PSM.

When the MTC device 100 enters the PSM state, the MME 510 determines that the corresponding MTC device 100 is not reachable and sets a PPF to 0. When the PPF is set to 0, the Downlink Data Notification (DDN) of the corresponding MTC device from the S-GW 520 is denied. When the MTC device 100 of the PSM state deviates from PSM and enters an active time or enters a reachable state again after the termination of the active time, the MME 510 sets the PPF to 1 and transmits paging to the corresponding MTC device when a DDN is received.

When MO data is generated during PSM, the MTC device 100 activates the access stratum (AS) and camps on a specific cell through a LMN selection and cell selection process. In this case, the MME 510 determines that the corresponding MTC device 100 is reachable and sets the PPF to 1. Thereafter, the MTC device 100 transmits a service request message in order to transmit the MO data, becomes the EMM-CONNECTED state, and transmits the MO data. In this case, the application server 700 recognizes that the MTC device 100 is in the EMM-CONNECTED state and requests a change of a PSM parameter (e.g., the value of an active time) or the termination of PSM from the MTC device 100. Thereafter, when the transmission of the MO data is terminated, the MTC device 100 enters the PSM state again. The MME 510 sets the PPF to 0. In this case, the application server 700 determines that a request for a change of a PSM parameter (e.g., the value of an active time) or the termination of PSM has been previously accepted by the MTC device 100 and transmits downlink data. The downlink data is transferred to the S-GW 520 through the P-GW 530. The S-GW 520 transmits a DDN to the MME 510. However, the MME 510 transmits a DDN denial to the S-GW 520 because the PPF has been set to 0. However, the application server 700 does not recognize such a situation and continues to transmit the downlink data. This continues to generate the transmission of the DDN of the S-GW 520 and the DDN denial of the MME 510. This results in an increase of unnecessary signaling and data transmission. The reason for this is that although the MTC device 100 has received a request for PSM from the application server 700, it is unable to perform a change of PSM by itself.

<Disclosures of this Specification>

Accordingly, a disclosure of this specification proposes solutions capable of solving the aforementioned problem.

The disclosures of this specification propose solutions for improving an inefficient system operation which may be generated when the MTC device 100 in the PSM state transmits MO data.

The solutions proposed by this specification are basically divided into a first disclosure regarding a solution using a service request message, a second disclosure regarding a solution using a procedure after a service request procedure, and a third disclosure regarding a solution using a TAU/RAU request message.

1. The First Disclosure of this Specification: A Solution Using a Service Request Message The first disclosure of this specification proposes a solution using a service request message. Such a solution is subdivided into a scheme for including an active time in a service request message, a scheme for including an indication in the service request message, and a scheme for performing another NAS procedure or a new procedure after the service request message. Each of the schemes is divided into a situation in which PSM is maintained after MO data is transmitted and a situation in which PSM is terminated after MO data is transmitted and described.

1-1. A Situation in which PSM is Maintained after the Transmission of MO Data is Terminated 1-1-1. If an MTC Device Also Wants to Maintain PSM and does not want a Change of a PSM Parameter In a situation in which PSM remains intact even after the transmission of MO data is terminated, if the MTC device 100 wants to maintain PSM without a change and does not want to change a PSM parameter, it may transmit a service request message without including the PSM parameter in the service request message. In this case, the MTC device may use an existing PSM parameter (e.g., the value of an active time) without a change or may use a previously set PSM parameter (e.g., the value of an active time)).

1-1-2. If an MTC Device Wants to Maintain PSM, but Wants to Change a PSM Parameter In a situation in which PSM remains intact even after the transmission of MO data is terminated, if the MTC device 100 wants to maintain PSM without a change, but wants a change in an existing PSM parameter, the MTC device adds corresponding information to a service request message or performs an additional operation. In this case, the meaning that the MTC device 100 wants a change in existing PSM includes that the MTC device wants to change a PSM parameter (e.g., the value of an active time or the value of a periodic TAU/RAU timer) or to terminate PSM.

That is, when the MTC device 100 wants a change in existing PSM, it may include the value of its wanted active time or periodic TAU/RAU timer in a service request message. This is described with reference to FIG. 10*a*.

Figure 10A:
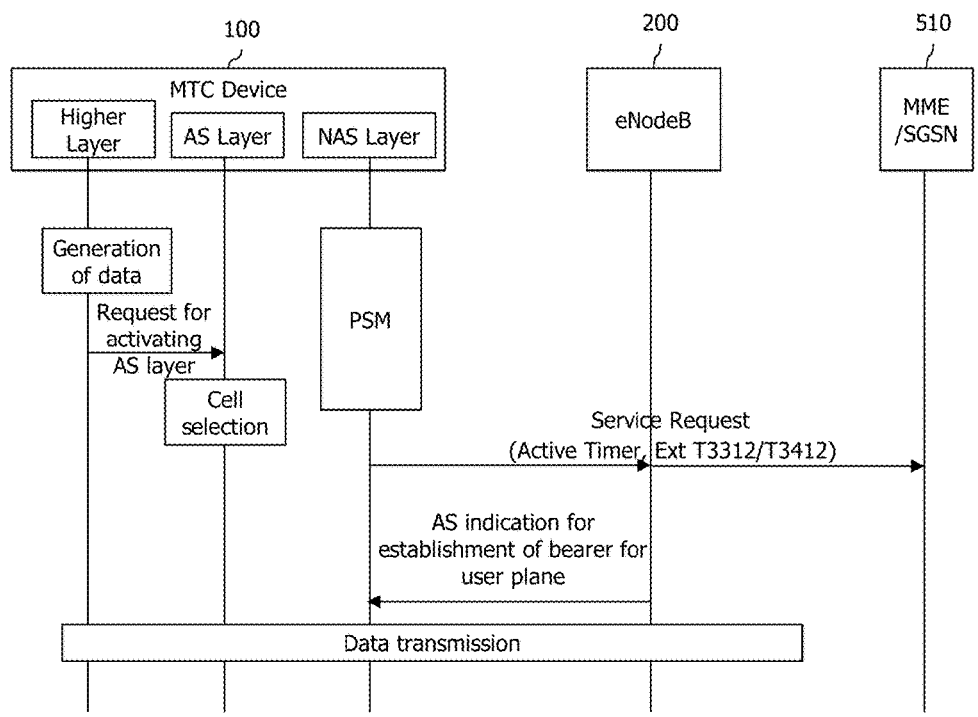
FIG. 10a shows an example in which an MTC device includes the value of its wanted active time in a service request message and transmits the service request message in accordance with one scheme of a first disclosure of this specification.

FIG. 10*a* shows an example in which the MTC device includes the value of its wanted active time in a service request message and transmits the service request message in accordance with one scheme of a first disclosure of this specification.

As may be seen with reference to FIG. 10*a*, when MO data is generated, the MTC device 100 in the PSM state transmits a service request message while deviating from PSM. In this case, if the MTC device 100 wants to change a PSM parameter (e.g., the value of an active time), it adds its wanted PSM parameter, for example, the value of an active time and the value of a periodic TAU/RAU timer (e.g., Ext T3312/T3412) to the service request message and transmits the service request message.

1-1-3. If the MTC Device Wants the Termination of PSM

When MO data is generated, the MTC device 100 in the PSM state transmits a service request message while deviating from PSM. In this case, if the MTC device 100 wants to terminate PSM, it may transmit the service request message without including a PSM parameter (e.g., the value of an active time) in the service request message. This is described with reference to FIG. 10*b*.

Figure 10B:
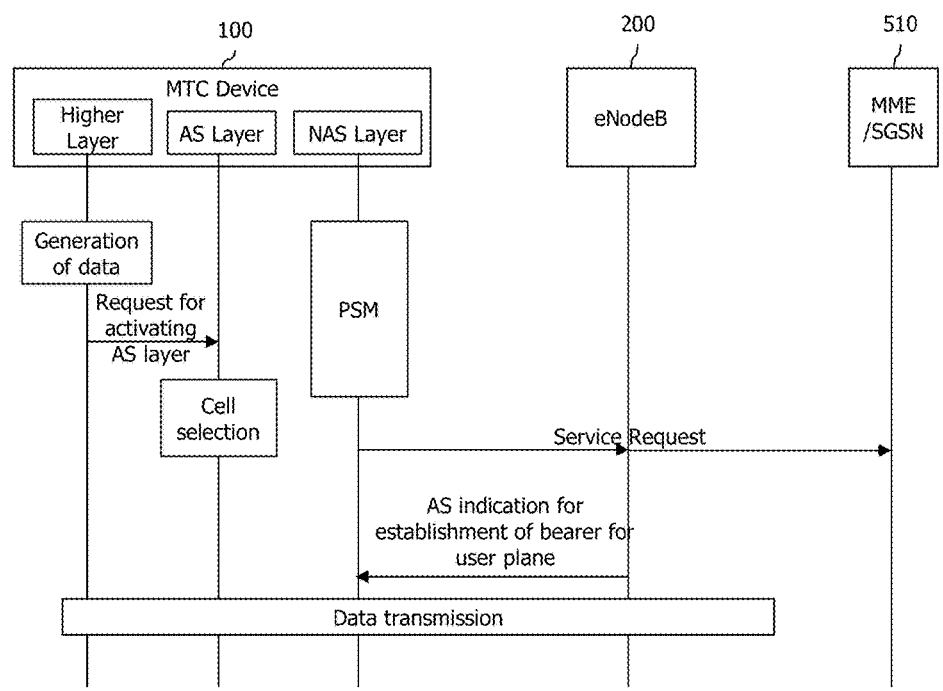
FIG. 10b shows an example in which an MTC device transmits a service request message without including the value of an active time in the service request message when it wants to terminate PSM in accordance with another scheme of the first disclosure of this specification.

FIG. 10*b* shows an example in which the MTC device transmits a service request message without including the value of an active time in the service request message when it wants to terminate PSM in accordance with another scheme of the first disclosure of this specification.

As may be seen with reference to FIG. 10*b*, when MO data is generated, if the MTC device 100 in the PSM state wants to terminate PSM, it may transmit a service request message without including a PSM parameter (e.g., the value of an active time) in the service request message.

Meanwhile, in FIGS. 10*a* and 10*b*, the MME/SGSN 510 which has received the service request message may include a PSM parameter, for example, the value of an active time and the value of a periodic TAU/RAU timer (e.g., Ext T3312/T3412) in a response message and transmit the response message. Meanwhile, the response message for the service request may be transmitted while an AS indication indicating that the establishment of a bearer for a user plane has been successfully performed is transmitted to the MTC device.

1-2. A Situation in which PSM is Terminated after the Transmission of MO Data is Terminated 1-2-1. If the MTC Device Wants to Maintain PSM The MTC device 100 may include an indication in a service request message and transmit the service request message if it wants to continue to use PSM.

The indication may be indicative of any one of "the maintenance of PSM using an existing PSM parameter" and "the maintenance of PSM using a new PSM parameter."

1-2-2. If the MTC Device Wants to Maintain PSM, but Requires a Change of a PSM Parameter After the transmission of MO data is terminated, if the MTC device wants to maintain PSM, but requires a change of a PSM parameter in a situation in which PSM is terminated, the MTC device may include an indication indicative of such a fact in a service request message and transmit the service request message.

If the indication is included, an additional procedure for changing a PSM parameter, for example, a TAU/RAU procedure may be performed. Alternatively, if the MTC device 100 wants to maintain PSM, but wants a change of a PSM parameter, it may include its wanted PSM parameter in a service request message and transmits the service request message.

As described above, the MTC device may include a different indication in a service request message depending on whether it wants to maintain PSM or whether it wants to maintain PSM, but requests a change of a PSM parameter. Specifically, this is described with reference to FIG. 10*c*.

Figure 10C:
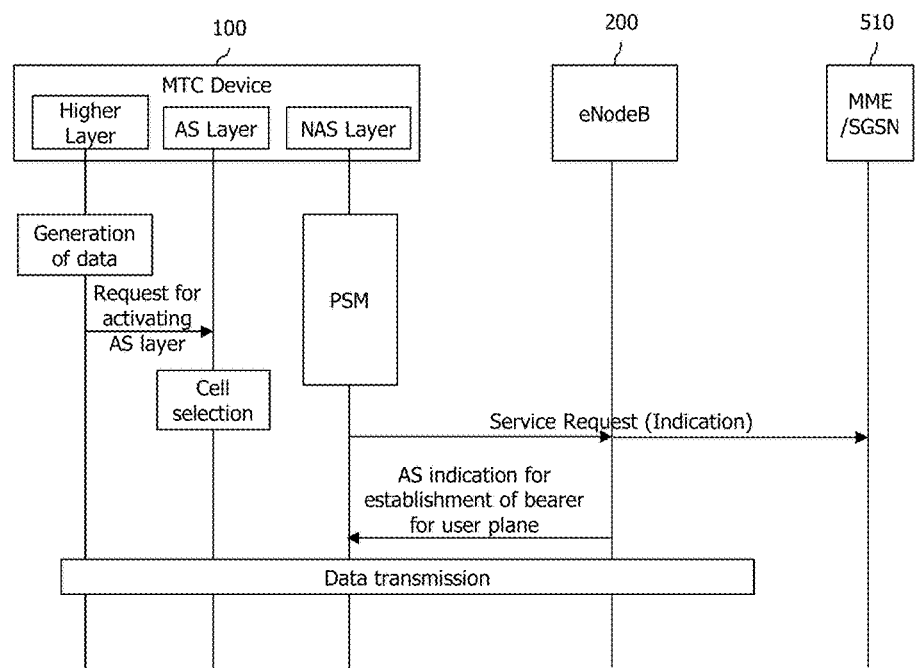
FIG. 10c shows an example in which an indication is included in a service request message in accordance with another scheme of the first disclosure of this specification.

FIG. 10*c* shows an example in which an indication is included in a service request message in accordance with another scheme of the first disclosure of this specification.

As shown in FIG. 10*c*, the MTC device may include a different indication in a service request message depending on whether it wants to maintain PSM or it wants to maintain PSM, but requests a change of a PSM parameter.

1-2-3. If the MTC Device Wants to Maintain PSM

After the transmission of MO data is terminated, if the MTC device also wants to terminate PSM in a situation in which PSM is terminated, the MTC device includes an indication, indicating that it wants to terminate PSM instead of the value of an active time, in a service request message and transmits the service request message. Accordingly, PSM is terminated.

Alternatively, the MTC device may include or may not include an indication in a service request message depending on whether it wants to maintain PSM or whether it wants to maintain PSM, but requests a change of a PSM parameter or wants to terminate PSM. For example, if an indication is not included in a service request message, it may mean that PSM is maintained using an existing PSM parameter. If an indication is included in a service request message, it may mean a change including the termination of existing PSM. For example, if the value of an indication is 0, it may mean the termination of PSM. In contrast, if the value of an indication is 1, it may mean a change of the PSM parameter (e.g., the value of an active time). In order to change a PSM parameter (e.g., the value of an active time), after the transmission of MO data is completed, an additional RAN/TAU procedure may be performed.

2. The Second Disclosure of this Specification: A Scheme Using Another Procedure after a Service Request Procedure 2-1. A Situation in which PSM is Maintained after the Transmission of MO Data is Terminated In a situation in which PSM remains intact even after the transmission of MO data has been terminated, if the MTC device 100 also maintains PSM, but wants a change of a PSM parameter, it triggers an additional procedure. The additional procedure maybe a procedure for transmitting a common NAS message or a procedure for transmitting another NAS message.

Figure 11:
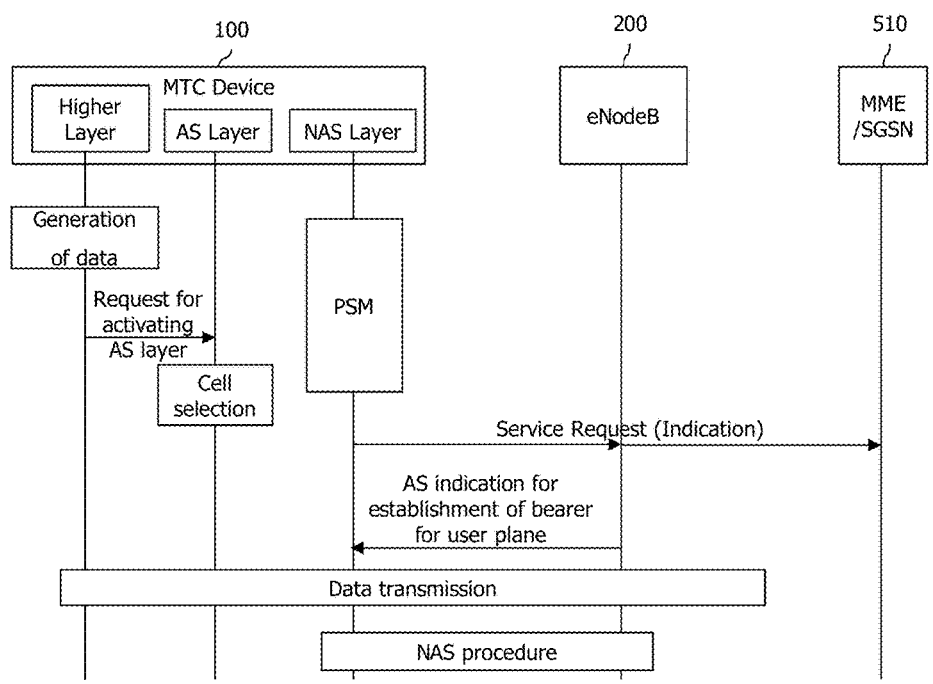
FIG. 11 shows an example in which an NAS procedure is triggered in accordance with one scheme of a second disclosure of this specification.

FIG. 11 shows an example in which an NAS procedure is triggered in accordance with one scheme of a second disclosure of this specification.

As may be seen with reference to FIG. 11, in a situation in which PSM remains intact even after the transmission of MO data has been terminated, if the MTC device 100 also maintains PSM, but wants a change of a PSM parameter, it includes an indication indicative of the maintenance of PSM using a "new PSM parameter" in a service request message, transmits the service request message, and then triggers an additional NAS procedure. The additional procedure may be a procedure for transmitting a common NAS message or a procedure for transmitting another NAS message. The MTC device may request a PSM parameter (e.g., the value of an active time) through such an additional procedure.

3. The Third Disclosure of this Specification: A Scheme Using a TAU/RAU Request Message 3-1. A Situation in which PSM is Maintained after the Transmission of MO Data is Terminated In a situation in which PSM remains intact even after the transmission of MO data has been terminated, the MTC device 100 transmits a TAU/RAU request message only when it wants a change of PSM. In this case, the meaning that a change of PSM is wanted includes that PSM is maintained, but a change of a PSM parameter (e.g., the value of an active time or periodic TAU/RAU timer) or the termination of PSM is wanted. Accordingly, when the MTC device 100 wants a change of a PSM parameter, it may include the value of its wanted active time or the value of a periodic TAU/RAU timer in a TAU/RAU request message and transmit the TAU/RAU request message. If the MTC device 100 wants to terminate PSM, it may transmit the TAU/RAU request message without including the value of the active time and the value of the periodic TAU/RAU timer in the TAU/RAU request message. In this case, a network understands that the MTC device 100 no longer wants the use of PSM.

3-2. A Situation in which PSM is Terminated after the Transmission of MO Data is Terminated In a situation in which PSM is terminated even after the transmission of MO data has been terminated, if the MTC device 100 wants to use PSM, the MTC device may notify a network that it wants to use PSM through a TAU/RAU request message at a point of time at which the MTC device wants to use PSM or a point of time at which the MTC device wants to change an existing PSM parameter.

As described above, in both the situation in which PSM is maintained and the situation in which PSM is terminated after the transmission of MO data has been terminated, a TAU/RAU request message may be divided into 'always', 'right before', and 'thereafter' on the basis of a point of time at which MO data is transmitted.

3-3. A Scheme in which a TAU/RAU Request Message is Able to be Always Transmitted at any Time on the Basis of a Point of Time at which MO Data is Transmitted The MTC device 100 may notify a network of a change of a PSM parameter (e.g., the value of an active time) or the termination of PSM through a TAU/RAU request message at any time at a point of time at which a change of the PSM parameter or the termination of PSM is required. This is described with reference to FIG. 12*a*.

Figure 12A:
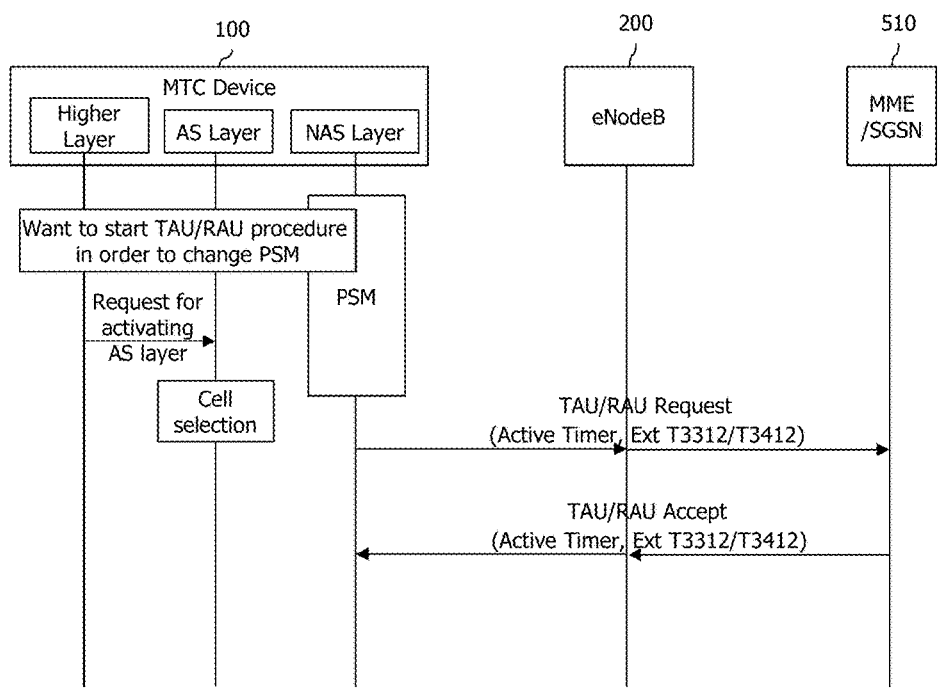
FIG. 12a is an exemplary diagram showing a flowchart in accordance with one scheme of a third disclosure of this specification.

FIG. 12*a* is an exemplary diagram showing a flowchart in accordance with one scheme of a third disclosure of this specification.

As may be seen with reference to FIG. 12*a*, the MTC device in the PSM state may request a change of a PSM parameter (e.g., the value of an active time or the value of a periodic TAU/RAU timer) or the termination of PSM by transmitting a TAU/RAU request message at any time regardless of the generation of MO data.

Meanwhile, the meaning that a change of the PSM parameter (e.g., the value of the active time or the value of the periodic TAU/RAU timer) or the termination of PSM may be requested at any time through the TAU/RAU request message may include a case corresponding to a specific time or a specific situation.

For example, the condition of the MTC device which may request a change of PSM may be limitedly permitted depending on ECM mode (ECM-IDLE, ECM-CONNECTED). That is, only in ECM-CONNECTED, the MTC device may be allowed to transmit a TAU request message for a change of PSM. More specifically, if the MTC device 100 wants a change of PSM while transmitting MO data, it may be allowed to trigger a TAU/RAU procedure for requesting a change of PSM. In this case, a point of time at which a TAU/RAU request message is actually transmitted after the TAU/RAU procedure is triggered may be the time when the MTC device is in the ECM-CONNECTED state or right after the ECM-CONNECTED state or after the ECM-CONNECTED state. In this case, if the MTC device is in the ECM-IDLE state at a point of time at which a change of PSM is requested, it is unable to perform a TAU/RAU procedure for requesting a change of PSM.

3-4. A Scheme in which a TAU/RAU Request Message is Able to be Transmitted Only Before the Transmission of MO Data If the MTC device 100 in the PSM state wants to transmit MO data, the MTC device 100 may first transmit a TAU/RAU request message before it transmits a service request message after it activates the access stratum (AS).

Figure 12B:
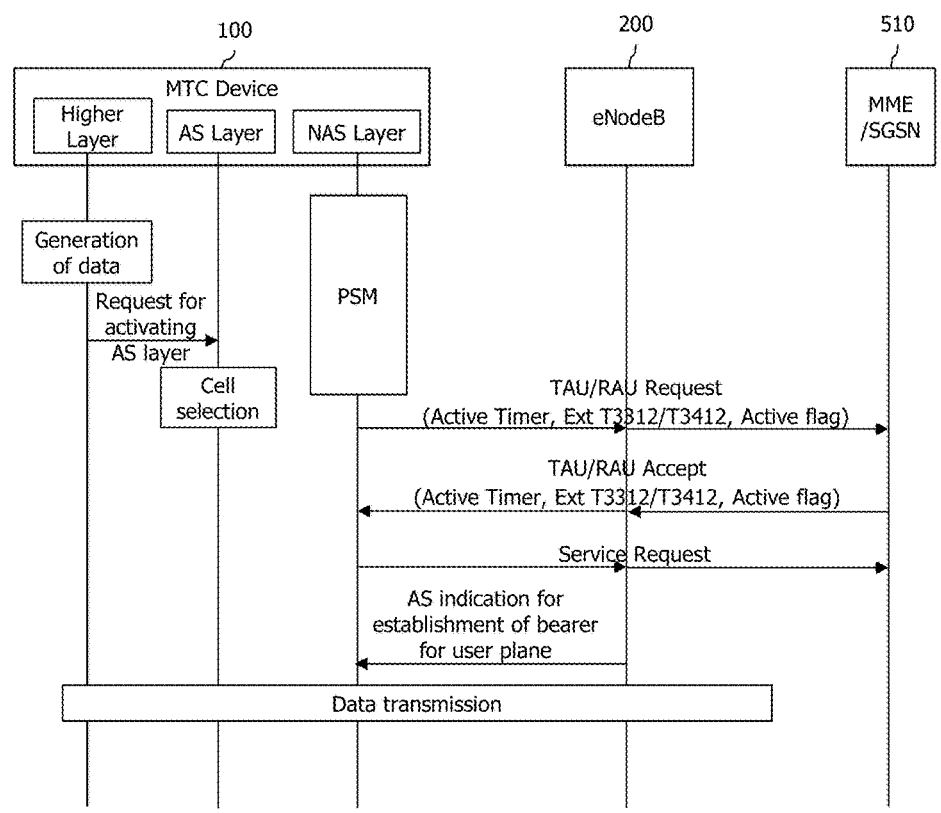
FIG. 12b is an exemplary diagram showing a flowchart in accordance with another scheme of the third disclosure of this specification.

FIG. 12*b* is an exemplary diagram showing a flowchart in accordance with another scheme of the third disclosure of this specification.

As may be seen with reference to FIG. 12*b*, when MO data is generated in the PSM state, the MTC device may transmit a TAU/RAU request message regardless of a change of a system condition (e.g., a change of a tracking area (TA)).

In this case, the MTC device may include an active flag in the TAU/RAU request message and transmit the TAU/RAU request message so that the MO data may also be transmitted after the TAU/RAU request message is transmitted. If the active flag is included in the TAU/RAU request message and the TAU/RAU request message is transmitted as described above, the MTC device may perform a procedure similar to a service request procedure and thus transmit the MO data.

3-5. A Scheme in which a TAU/RAU Request Message is Able to be Transmitted Only after a Point of Time at which MO Data is Transmitted If the MTC device 100 wants a change of PSM, it may transmit a service request message, may terminate the transmission of MO data, and may then transmit a TAU/RAU request message.

Figure 12C:
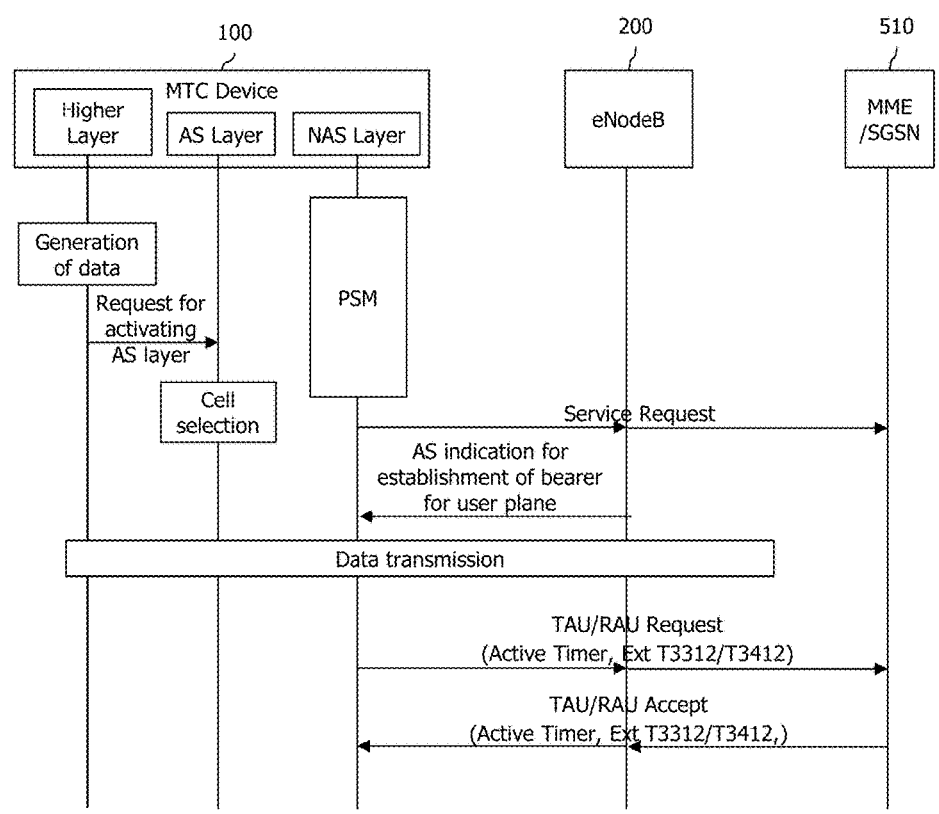
FIG. 12c is an exemplary diagram showing a flowchart in accordance with yet another scheme of the third disclosure of this specification.

FIG. 12c is an exemplary diagram showing a flowchart in accordance with yet another scheme of the third disclosure of this specification.

As may be seen with reference to FIG. 12c, if the MTC device 100 wants a change of PSM, it may transmit a service request message, may terminate the transmission of MO data, and may then transmit a TAU/RAU request message.

<A Summary of the Third Disclosure of this Specification>

Figure 13:
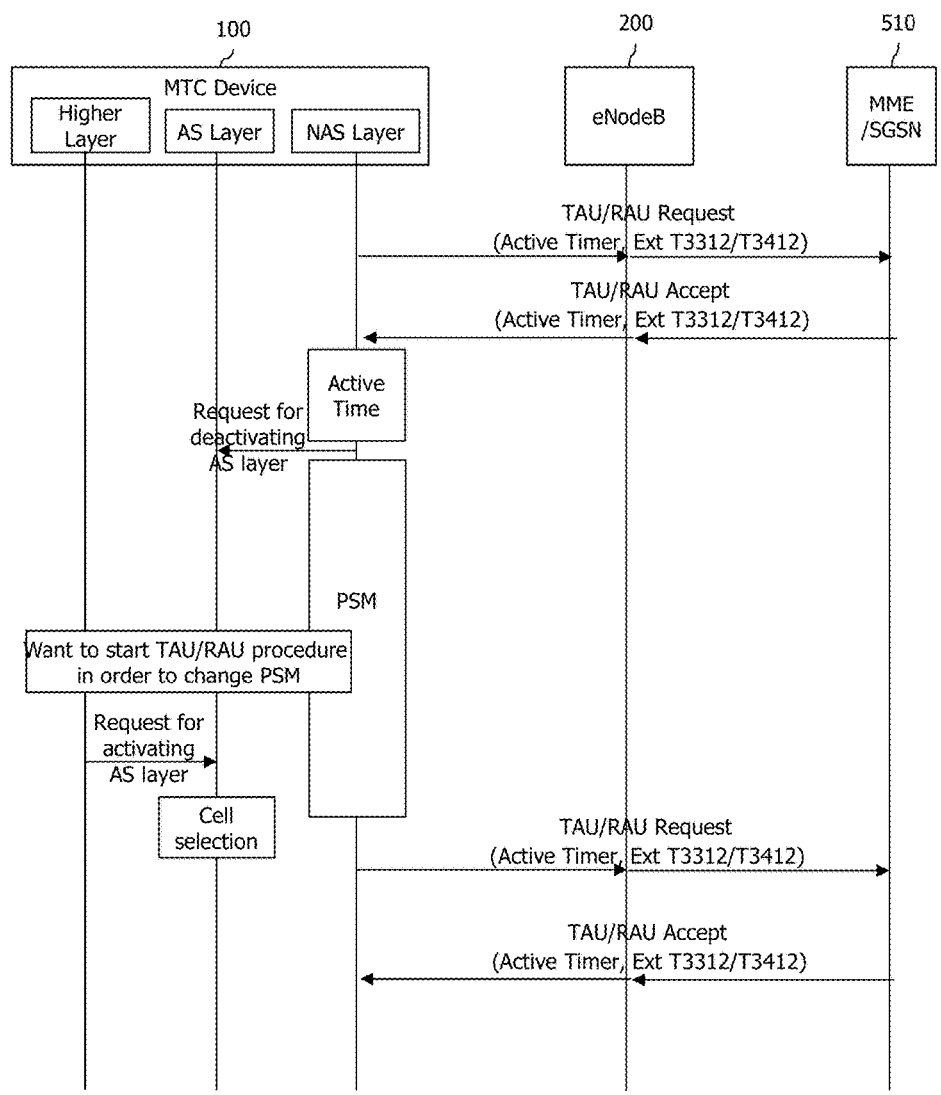
FIG. 13 is an exemplary diagram showing a flowchart in accordance with one scheme of the third disclosure of this specification.
Figure 14:
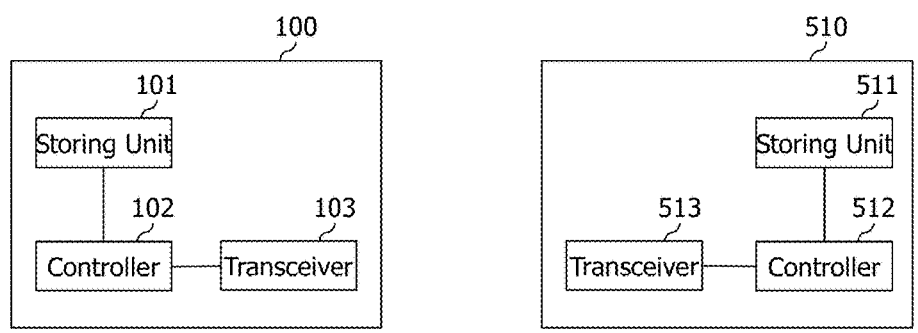
FIG. 14 is block diagram showing the configuration of an MTC device 100 and an MME 510 in accordance with an embodiment of the presented invention.

FIG. 13 is an exemplary flowchart in accordance with one scheme of the third disclosure shown in FIG. 12a.

As shown, if the MTC device 100 requires PSM, the NAS layer of the MTC device 100 may transmit a TAU/RAU request message, including the value of its wanted active time and the value of a periodic TAU/RAU timer, to the MME 510.

If the MME 510 accepts the use of PSM of the MTC device 100, it allocates the value of an active time and the value of a periodic TAU/RAU timer suitable for the MTC device 100 to the MTC device 100 based on the values of the active time and the periodic TAU/RAU timer included in the TAU/RAU request message. Next, the MME 510 transmits a TAU/RAU acceptance message, including the allocated values of the active time and the periodic TAU/RAU timer, to the MTC device 100.

In response thereto, the MTC device 100 activates the access stratum only during the active time based on the value of the active time included in the TAU/RAU acceptance message and then deactivates the access stratum. To this end, the NAS layer of the MTC device 100 enters the PSM state by requesting deactivation from the access stratum. In the PSM state, the MTC device 100 may not receive downlink data as if it has been powered off, but may have been registered with a network so that the MTC device may transmit uplink data at any time.

However, if the stop of the PSM or a change of the second active time is required, the MTC device 100 may activate the access stratum and transmit a TAU/RAU request message at that point of time.

What is claimed is:

1. A method supporting Power Saving Mode (PSM) in a wireless device, the method comprising:
   transmitting a first message to a network entity when PSM is required;
   receiving, from the network entity, a second message including an active time value;
   entering a PSM state based on the active time value such that the wireless device does not receive any downlink data, but remains registered with the network entity;
   transmitting a tracking area update (TAU) or routing area update (RAU) request message, as soon as the PSM needs to be stopped, even before a next periodic TAU or RAU procedure, irrespective of the active time value,
   wherein the TAU or the RAU request message is further transmitted as soon as the active time value needs to be changed even before the next periodic TAU or RAU procedure.

2. The method of claim 1, wherein:
   the first message is a TAU or RAU request message, and the second message is a TAU or RAU acceptance message.

3. The method of claim 1, wherein the TAU or the RAU request message is further transmitted when a TAU timer or a RAU timer needs to be changed.

4. The method of claim 1, wherein if a change in the active time is required, the TAU or RAU request message includes one or more of:
   a value of a second active time, a value of a TAU timer, and a value of a RAU timer requested by the wireless device.

5. The method of claim 4, wherein the value of the TAU timer and the value of the RAU timer are defined by Ext T3312 or EXT T3412.

6. The method of claim 1, wherein entering the PSM state includes deactivating an Access Stratum (AS).

7. The method of claim 6, wherein the step of transmitting the TAU or RAU request message includes
   activating the access stratum when the PSM needs to be stopped or when the active time value needs to be changed.

8. A wireless device supporting Power Saving Mode (PSM), the wireless device comprising:
   a transceiver; and
   a controller that:
   controls the transceiver to transmit a first message to a network entity when PSM is required and to receive, from the network entity, a second message including an active time value,
   controls the wireless device to enter a PSM state based on the active time value such that the wireless device does not receive any downlink data, but remains registered with the network entity, and
   further controls the transceiver to transmit a tracking area update (TAU) or routing area update (RAU) request message, as soon as the PSM needs to be stopped, even before a next periodic TAU or RAU procedure, irrespective of the active time value,
   wherein the TAU or the RAU request message is further transmitted as soon as the active time value needs to be changed even before the next periodic TAU or RAU procedure.

9. The wireless device of claim 8, wherein:
   the first message is a TAU or RAU request message, and the second message is a TAU or RAU acceptance message.

10. The wireless device of claim 8, wherein the TAU or the RAU request message is further transmitted when a TAU timer or a RAU timer needs to be changed.

11. The wireless device of claim 8, wherein if a change in the active time is required, the TAU or RAU request message includes one or more of:
    a value of a second active time, a value of a TAU timer, and a value of a RAU timer requested by the wireless device.

12. The wireless device of claim 11, wherein the value of the TAU timer and the value of the RAU timer are defined by Ext T3312 or EXT T3412.

13. The wireless device of claim 8, wherein the controller further controls the transceiver to deactivate an Access Stratum (AS) in order for the wireless device to enter the PSM state.

14. The wireless device of claim 13, wherein the controller controls the transceiver to activate the access stratum when the PSM needs to be stopped or when the active time value needs to be changed.

* * * * *